June 24, 1947.  P. BAIA  2,422,815
TRANSITION ATTACHMENT FOR MOTION PICTURE CAMERAS
Filed Feb. 26, 1944  3 Sheets-Sheet 1
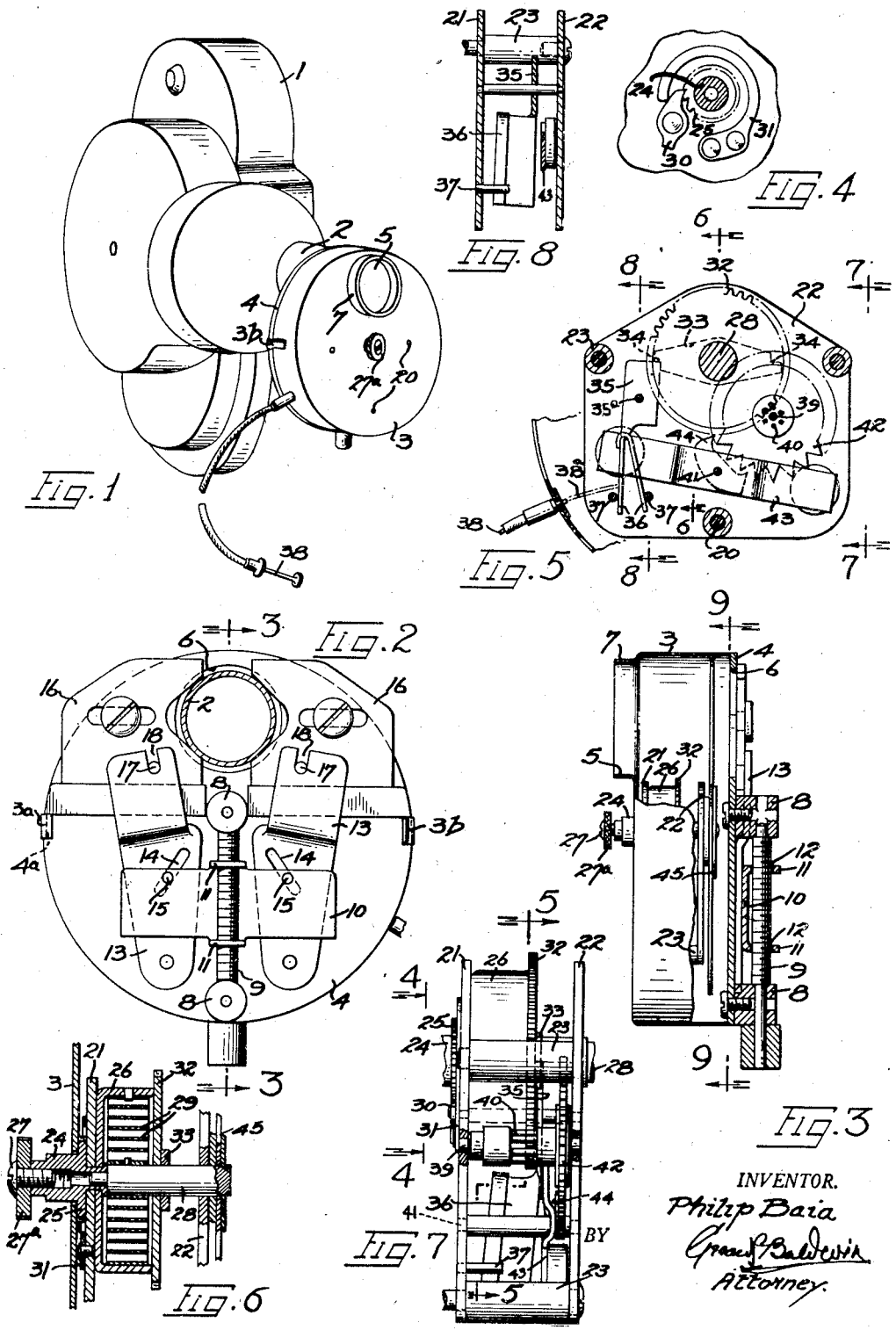
INVENTOR.
Philip Baia
BY
Attorney.

INVENTOR.
Philip Baia
BY
Attorney

INVENTOR.
Philip Baia
BY
Attorney

Patented June 24, 1947

2,422,815

UNITED STATES PATENT OFFICE 2,422,815

TRANSITION ATTACHMENT FOR MOTION-PICTURE CAMERAS

Philip Baia, Highland Park, Mich.

Application February 26, 1944, Serial No. 524,019

4 Claims. (Cl. 88—16)

This invention relates to improvements in transition attachments for motion picture cameras. It is an object of the invention to provide a simple form of attachment that may be mounted on the lens hood of such a camera for making transitions from one scene to another, or for gradually fading a scene either in or out.

It is often desirable to fade a scene either in or out during the continued movement of the film in one direction. Or if the camera is provided with means for winding back the film it is possible with my attachment to gradually fade out one scene, and then, after winding the film back the number of frames which have been exposed—or partly exposed—during the operation of the attachment, to re-expose the same frames so that a second scene may be gradually faded in on the frames on which the first scene was faded out.

The transition attachment includes a casing having aligned openings therethrough, means for securing the casing to a lens hood so that the said openings are in alignment with the lens, a spring actuated shaft in the casing adapted to rotate through 180 degrees, and a shutter means on the shaft which gradually masks or unmasks the lens so that upon completion of alternate movements of the shaft the lens is completely masked or unmasked.

The invention contemplates the use of different forms of shutter means upon the shaft. One form of shutter means consists of an opaque, light obstructing member so shaped that as it is rotated it progressively, during a one-half revolution of the shaft, masks a greater portion of the lens from one side of the latter until the said lens is completely masked; this member is also so shaped that during its next half revolution it gradually unmasks the lens. Moreover the unmasking occurs progressively from the same side of the lens from which the masking occurred during the first half revolution of the member. Consequently if one scene has been gradually faded out by use of the member and the film has been subsequently wound back, a second scene may be gradually faded in on the portions of the frames which remained unexposed during their initial passage in front of the lens. Obviously this member may also be utilized for either fading in or fading out when the film is continuously wound in one direction.

One modified form of the shutter means consists of a disc having an opaque, light obstructing portion and a transparent portion positioned at substantially 180 degrees to one another, and the intervening portions of the disc progressively more shaded from both sides of the transparent portion, so that during one-half a revolution of the disc the frames are progressively more underexposed and during the succeeding half revolution more fully exposed. Obviously this disc may be similarly employed either for fading in or fading out, or for fading one scene into another after the film has been wound back.

Another modification of the shutter means includes a boss to be mounted upon the shaft having two opaque, light obstructing arms thereon the inner adjacent faces of which are so shaped that in one position they together form an opening through which the lens is completely unmasked, and means carried by the boss for moving these arms as the shaft turns so that the opening is gradually closed and the lens thus completely masked during a one-half revolution of the shaft, and gradually unmasked during the succeeding half revolution.

Having thus briefly and broadly stated some of the objects and advantages of the invention I will now proceed to describe it in detail with the aid of the accompanying drawings, in which:

Figure 1 illustrates a perspective view of a motion picture camera equipped with my invention.

Figure 2 is an enlarged view of the attachment showing the lens hood in section.

Figure 3 is a partial section on the line 3—3 of Figure 2.

Figure 4 is a view on the line 4—4 of Figure 7.

Figure 5 is a section on the line 5—5 of Figure 7.

Figure 6 is a section on the line 6—6 of Figure 5.

Figure 7 is a view on the line 7—7 of Figure 5.

Figure 8 is a section on the line 8—8 of Figure 5.

Figure 21 is a section on the line 21—21 of Figure 20.

Figure 9:
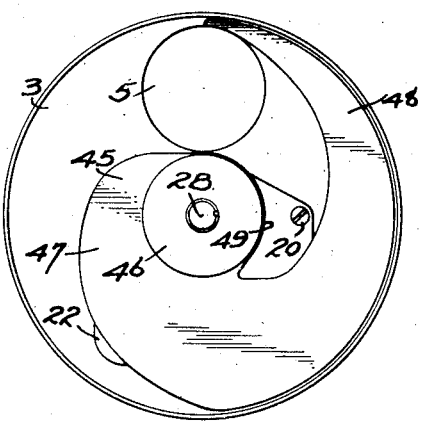
Figure 9 is a section on the line 9—9 of Figure 3.

Referring to the drawings, 1 designates a conventional motion picture camera having a lens hood 2. The transition attachment includes a casing 3 having a cover 4 thereon equipped with means for mounting the latter upon hoods of different sizes. Formed through the casing 3 and cover 4 are aligned openings 5 and 6 respectively, and around the opening 5 an annular outwardly projecting flange 7 is formed to support a filter or hood not shown. Projecting outwardly from the cover 4 are two spaced bearings 8 supporting a spindle 9 for rotation which is threaded intermediately of its length and is so positioned that its axis extends through and at right angles to the axis of the cover opening 6. Mounted on the outer face of the cover 4 is a guide 10 having outwardly bent ears 11 on its opposite margins. Formed through the ears 11 are threaded apertures 12 which are in threaded engagement with the spindle 9 so that upon rotation of the latter the guide is moved toward and from the opening 6. Pivoted on the cover 4 one on each side of the spindle 9 are arms 13 through which intermediately of their length oppositely inclined slots 14 are formed. Each of these slots is engaged by a pin 15 projecting from the guide 10 so that upon movement of the latter the free ends of the arms are moved toward or away from one another. Mounted on the cover 4 at right angles to the axis of the opening 6 are slides 16 each having a pin 17 projecting therefrom which is in engagement with an open-ended slot 18 formed in the free extremity of one of the arms 13. Thus upon rotation of the spindle 9 the slides 16 are moved toward or away from one another, and formed in the opposed edge faces of the slides are recesses to engage opposite sides of the periphery of the lens hood 2. Any means may be utilized for holding the cover 4 upon the casing 3; in the present instance an inturned catch 3a extends from one side of the casing 3 through a peripheral slot 4a formed in the cover 4, and projecting forwardly from the opposite side of the casing 3 is a resilient latch 3b which also engages the cover 4 and at the same time permits ready removal of the latter.

Two spaced plates 21 and 22 are held immovable within the casing 3 and parallel with the closed integral end of the latter opposite the cover 4 by screws 20 having sleeves 23 thereon extending between the said plates. Projecting through a central opening in the casing 3 is a hub 24 upon which a ratchet wheel 25 is fixed within the casing, and inwardly beyond the ratchet wheel the diameter of the hub is reduced and extends through the plate 21 and also through one side of a spring housing 26 which is fixed to the said hub for rotation therewith. The hub is tubular and threaded into it from its outer extremity is a screw 27 by which a winding knob 27a is secured so that rotation of the latter turns the hub 24. Supported for independent rotation in the inner extremity of the bore of the hub 24 is the reduced end of a shaft 28 the opposite end of which is rotatably supported in the plate 22 through and beyond which the said shaft end projects. Pivoted on the outer face of the plate 21 between the latter and the adjacent end of the casing 3 is a pawl 30 and mounted also upon the said plate 21 is a spring 31 which tends to retain the said pawl in engagement with one of the teeth of the ratchet wheel 25 thereby limiting the latter and the hub 24 to rotation in one direction.

Mounted in the housing 26 and secured at its outer extremity to the peripheral flange of the latter is a coil spring 29 the inner end of which is secured to the shaft 28. Fixed upon the latter and closing one extremity of the housing 26 is a gear 32. A yoke 33 upon the outer face of the gear 32 is also mounted upon the shaft 28 for rotation therewith and has notches 34 formed in its opposite extremities which are relatively so disposed that upon completion of rotation of the shaft through 180 degrees one of the said notches is engaged by a pivoted stop 35. The latter is secured to the folded extremity of a substantially U-shaped spring 36 outward movement of the opposite ends of which is limited by pins 37 extending from the plate 21. Mounted in and projecting through the periphery of the casing 3 is an axially movable member 38 which when projected inwardly as indicated at 38a causes inward movement of one of the legs of the spring 36 and thus rotation of the stop 35 about its pivot axis 35a in an anti-clockwise direction, thereby releasing one of the notches 34 and permitting rotation of the shaft 28 by the coil spring 29. Upon release and return to its normal position of the member 38 the spring 36 returns the stop 35 to its notch-engaging position shown, so that upon completion of a half turn of the yoke 33 the latter is again engaged by the stop and held against further rotation until the member 38 is again inwardly projected.

The speed of rotation of the shaft 28 may be maintained uniform at a relatively slow speed by any preferred form of escapement such as the one hereafter described. Extending between and supported by the plates 21 and 22 are two parallel spindles 39 and 41. Fixed on the spindle 39 is a pin wheel 40 in mesh with the gear 32, and a star wheel 42. Mounted on the spindle 41 is a rocker bar 43 and a verge 44 which oscillate together about the axis of the said spindle. The opposite ends of the verge 44 alternately engage the star wheel 42 between adjacent teeth so that the speed of rotation of the shaft 28 is controlled by the oscillation of the rocker bar and verge as the star wheel 42 is turned by engagement of the gear 32 with the pin wheel 40. Mounted on the shaft 28 for rotation therewith between the plate 22 and the cover 4 is a shutter means 45.

Figure 10:
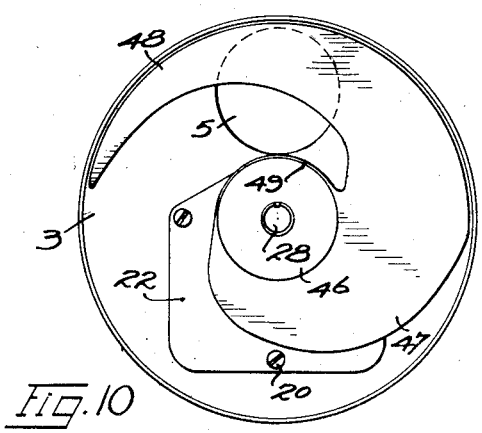
Figures 10 and 11 are views similar to Figure 9 but showing the shutter means in different rotary positions.
Figure 11:
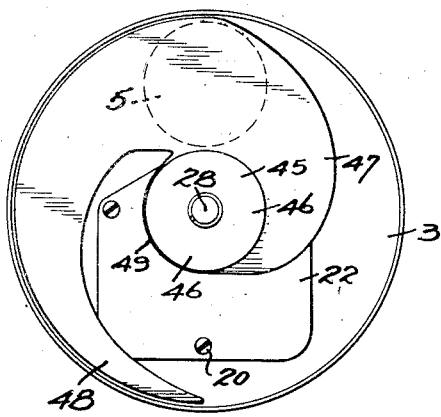

In Figures 9 to 11 the shutter means 45 consists of a boss 46 suitably mounted on the shaft 28 for rotation therewith, and a flat light-obstructing member 47 carried by the boss. The member 47 has a substantially crescent-shaped portion 48 the width of which through substantially a semi-circle increases from its pointed extremity. From the latter the outer periphery of the portion 48 is concentric with the bore of the boss 46 through substantially 180 degrees, and the radius of the outer periphery of this portion 48 is only slightly less than that of the casing 3 in which the shutter means 45 is housed, so that when the crescent-shaped portion 48 is opposite the opening 5 it projects radially outward beyond the side of the opening remote from the axis of the shaft 28.

Continuing from the inner extremity of the crescent-shaped portion 48 the outer periphery of the member 47 is inwardly inclined through substantially 180 degrees, so that as the member is turned in an anti-clockwise direction from its position shown in Figure 11 the opening 5 is gradually unmasked from its side farthest from the axis of the shaft 28 until it is completely exposed, at which time the pointed extremity of the crescent-shaped portion 48 projects outwardly beyond the opening 5 as shown in Figure 9. The inner periphery of the crescent-shaped portion is inwardly inclined through slightly less than 180 degrees so that as the member 47 is rotated in an anti-clockwise direction from its position shown in Figure 9 the opening 5 is gradually masked from its side farthest from the axis of the shaft 28 until it is completely covered when the member 47 has turned through 180 degrees to the position shown in Figure 11. To prevent masking of the opening 5 from its side nearest to the axis of the shaft 28 during this 180 degree movement, and to provide attachment of the member 47 to the boss 46 completely around the latter the smaller extremity of the outer periphery of the member is continued substantially circularly adjacent the boss as shown at 49 inwardly of the substantially crescent-shaped portion 48.

The formation of the outer periphery of the member 47 from the inner extremity of the crescent-shaped portion 48 corresponds with the formation of the inner periphery of the crescent-shaped portion 48 from its pointed extremity in such manner that the gradual masking and unmasking of the opening correspond. That is at any given angular distance after masking or unmasking commences the masked portion of the opening 5 in the one case is exactly the same as the unmasked portion in the other.

Figures 12, 13:
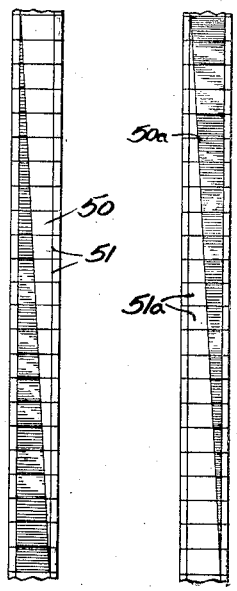
Figures 12 and 13 are diagrammatic views showing portions of films wherein the shading on the different frames indicates the portions thereof which are unexposed during the operation of the attachment.

If the film 50 shown in Figure 12 is exposed during rotation of the member 47 in an anti-clockwise direction from its position shown in Figure 9 to that shown in Figure 11, the width of the masked portions of the frames 51, indicated by shading, progressively increases until the entire frame is masked upon completion of a half turn of the shaft 28. Again, on the frames 51a of the film 50a shown in Figure 13 the shading shows the progressive reduction in width of the masked portions which results if the member 47 is rotated from its position shown in Figure 11 to that shown in Figure 9 during the exposure of that portion of the film. It is therefore obvious that the shutter means 45 shown in Figures 9 to 11 may either be employed for fading-in or fading-out a scene if the film is continuously rotated in one direction; or after a scene has been faded-out as shown diagrammatically in Figure 12 the film may be wound back so that a second scene may be faded-in on the hitherto unexposed portions of the frames employed for the previous fade-out.

Figures 14, 15:
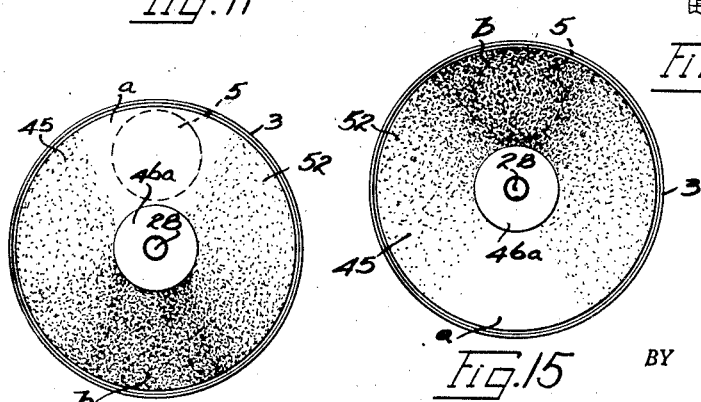
Figures 14 and 15 are views of a modified shutter means showing the latter in two different rotary positions.
Figure 16:
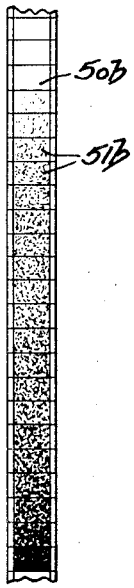
Figures 16 and 17 are diagrammatic views showing portions of films wherein the stippling indicates various degrees of underexposure of the frames during the operation of the modified form of shutter means.
Figure 17:
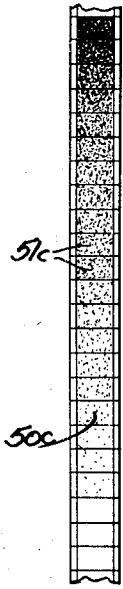
Figure 18:
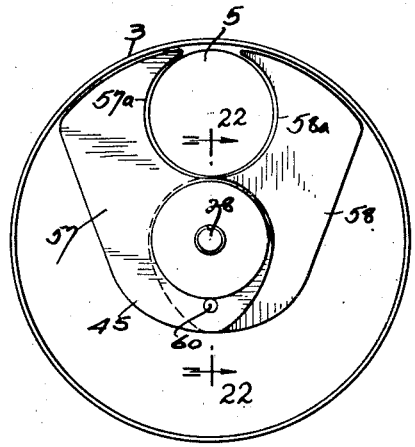
Figure 18 shows another modified form of shutter means mounted on the shaft.
Figure 19:
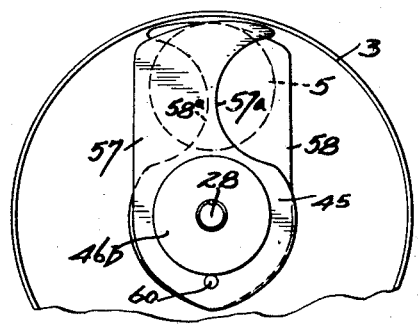
Figure 19 is another view of this shutter means showing the latter positioned to mask the casing openings.

The modified form of shutter means 45 shown in Figures 14 and 15 includes a disc 52 secured to and projecting circularly from a boss 46a mounted upon the shaft 28 for rotation therewith. The disc 52 has two diametrically opposed portions a and b which are transparent and opaque respectively, and between the former and the latter portion the sides of the disc are progressively and circularly more shaded, by smoking or by any other preferred means, so that if a film is exposed during rotation of the disc from its position shown in Figure 14 to that shown in Figure 15, the frames 51b of the film 50b, Figure 16, are progressively more underexposed as indicated by the stippling until no exposure at all occurs. In Figure 17 the progressive decrease in the underexposure, indicated by the stippling, denotes the manner in which the frames 51c of the film 50c are progressively more fully exposed during rotation of the disc 52 from its position shown in Figure 15 to that shown in Figure 14. Thus a fade-in or fade-out may be obtained with the use of the disc 52 instead of the member 47, and this disc may also be utilized if the film is to be wound back and a second scene faded-in on the frames upon which a previous scene has already been faded-out.

A further modification of the shutter means 45 is shown in Figures 18 to 22 wherein two cams 55 and 56 superimposed one upon the other are secured to the boss 46b which is again mounted upon the shaft 28 for rotation therewith. 57 and 58 denote two apertured arms mounted upon the cams 55 and 56 respectively. Extending from one of the arms 57 is a pin 60 which extends through the other arm 58 and into an opening 61 formed in the cover 4, thereby holding the arms against rotation with the cams by which they are engaged. The pin 60 also provides a pivot upon which the arms are separately rocked by the cams during their rotation. Thus as the boss 46b is turned with the shaft 28 and the cams 55 and 56 are also rotated through 180 degrees the arms 57 and 58 are swung from their positions shown in Figure 18 to those shown in Figure 19 or vice versa. The inner opposed edges 57a and 58a of the arms 57 and 58 respectively are so shaped that in their respective positions shown in Figure 18 they together form an aperture through which the opening 5 is completely unmasked, and during rotation of the shaft 28 through 180 degrees the arms are swung by the cams about the pin 60 to their positions shown in Figure 19 when the opening 5 is completely masked by the said arms.

Figure 23:
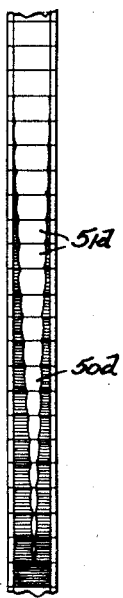
Figures 23 and 24 are diagrammatic views of pieces of film wherein the shading on the frames indicates the portions thereof which are unexposed during the operation of the last named modification of the shutter means.
Figure 24:
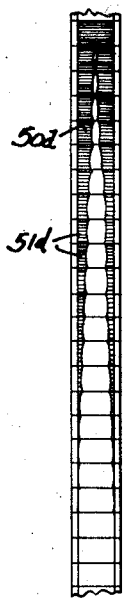
Figure 20:
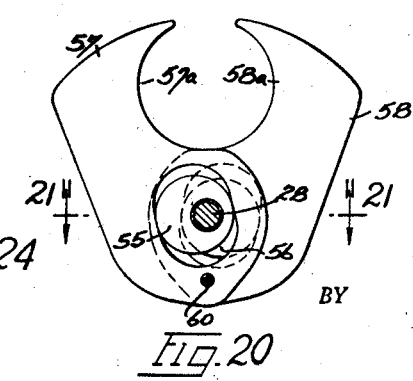
Figure 20 shows the rockable arms and their cams.
Figure 22:
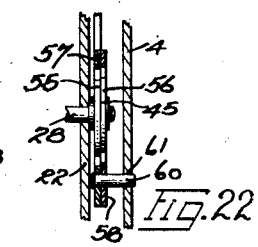
Figure 22 is a section on the line 22—22 of Figure 19.

Figures 23 and 24 diagrammatically illustrate the manner in which the frames 51d of the film 50d are progressively masked from opposite sides and unmasked from the center, during movement of the arms toward or away from one another. Due to the movement of the arms, while this shutter means is highly effective for making fade-ins or fade-outs, it can not be satisfactorily employed in cases where it is desired to wind back the film in the manner hereinbefore described.

While in the foregoing the preferred embodiments of the invention have been described and shown, it is understood that further alterations and modifications may be made thereto, provided the said alterations and modifications fall within the scope of the appended claims.

What I claim is:

1. A transition attachment for motion picture cameras including a casing having aligned apertures in the front and rear walls thereof, means for supporting said casing on a lens hood with it's apertures in axial alignment with the lens, a shaft in the casing, spring means for turning the shaft, means for arresting rotation of the shaft after it has turned a pre-determined angular distance, means for releasing the arresting means, a pair of superposed cams mounted on the shaft and arranged on each side thereof, a pin extending from the casing, two apertured shutter arms pivoted on the pin to swing to and fro in overlapping relationship one with the other, each cam extending into the aperture in one of the shutter arms to rock the arm about it's pivot axis, the adjacent portions of the arms together substantially encircling an opening coaxial with the casing apertures and larger than the latter at one rotary position of the shaft, said cams being adapted to move the arms to completely close the opening during one rotary movement of the shaft and to reform and gradually enlarge the opening to it's initial size during the next rotary movement of the shaft.

2. A transition attachment for motion picture cameras including a casing having aligned apertures in the front and rear walls thereof, a shaft rotatably supported centrally of the casing, a spring for rotating the shaft, means coaxial with the shaft and rotatable independently thereof for winding the spring, means for arresting the shaft after it has turned through 180°, means for releasing the arresting means to permit further rotation of the shaft, means on the casing for engaging a lens hood and holding the apertures in axial alignment with the lens, two cams on the shaft for rotation therewith, coacting shutter arms each apertured to receive one of the cams, a pin projecting from the casing on which both shutter arms are pivoted for oscillatory to and fro swinging movement, said cams being displaced 180° and said shutter arms being arranged to move in overlapping relationship one with the other whereby rotation of the shaft and cams through 180° gradually moves the arms to completely obstruct the passage of light between the apertures and into the lens hood and the succeeding rotary movement of the shaft through 180° gradually moves the shutter arms to completely unmask the apertures and admit light into the lens hood.

3. A transition attachment for motion picture cameras including a casing having aligned apertures in the front and rear walls thereof, a hub mounted for rotation in the casing and projecting therethrough, means for limiting the rotary movement of the hub to one direction, a shaft coaxial with the hub and supported for independent rotation relative thereto with one end of said shaft supported by said hub, a coil spring having one extremity connected to the hub, a key extending from the hub for turning the latter and winding the spring, the opposite end of the spring being connected to the shaft to turn the latter, a yoke fixed on the shaft, a spring pressed stop to engage the yoke and halt rotation of the shaft, means for moving the stop to release the yoke and permit rotation of the shaft, a spindle, gear means drivingly connecting the shaft and spindle, a star wheel fixed on the spindle, a pivotally mounted verge opposite ends of which alternately engage the star wheel to maintain the speed of rotation of the shaft uniform, shutter means carried by said shaft and movable between the front and rear walls of said casing by which the passage of light through the aligned apertures therein is gradually obstructed during rotation of the shaft 180° and by which the passage of light through the aligned apertures is increased during the next rotary movement of the shaft 180°, and means on the casing for supporting the latter on a lens hood with the axis of the apertures in alignment with the apertures of said hood, said yoke being arranged on the shaft such that in one of it's positions the shutter means will obstruct the passage of light through said aligned apertures and when displaced an angular distance of 180° from it's original position will unmask said apertures and permit passage of light therethrough.

4. A transition attachment for motion picture cameras including a casing having aligned apertures in the front and rear walls thereof offset from the center of said casing, a hub supported for rotation centrally of the casing and extending through one side thereof, means limiting the rotary movement of the hub to one direction of rotation, a shaft in the casing coaxial with the hub and having at least one end supported by said hub for independent rotation, a spring housing secured to the hub, a coil spring in the housing having it's outer extremity secured thereto and it's inner extremity affixed to the shaft to turn the latter, a winding knob on the outer extremity of the hub, a yoke fixed on the shaft, a stop to engage either end of said yoke and halt rotation of the shaft after the same has turned an angular distance of 180°, means for disengaging the stop from the yoke, means on the casing for supporting the latter on a lens hood with said apertures in axial alignment with the optical axis of said hood, and shutter means mounted within said casing controlled by said shaft for gradually obstructing the passage of light through said aligned apertures during one rotary movement of the shaft and for gradually unmasking the apertures and permitting passage of light through said apertures during the next rotary movement of the shaft, said yoke being positioned on said shaft relative to said shutter means such that rotation of said yoke about an angular distance of 180° from one of it's positions of rest will move said shutter means to obstruct the passage of light through said apertures and in it's next movement of rotation about an angular distance of 180° will move said shutter means to unmask said aligned apertures and permit passage of light therethrough.

PHILIP BAIA.

REFERENCES CITED

The following references are of record in the file of this patent:

UNITED STATES PATENTS

| Number | Name | Date |
|---|---|---|
| 2,217,718 | Ulano | Oct. 15, 1940 |
| 2,305,664 | Bogopolsky | Dec. 22, 1942 |
| 2,307,297 | Phillimore | Jan. 5, 1943 |

FOREIGN PATENTS

| Number | Country | Date |
|---|---|---|
| 663,815 | Germany | Aug. 13, 1938 |